Oct. 4, 1932.  C. W. VOGT ET AL  1,881,106
CAN FILLER
Filed Oct. 25, 1929    2 Sheets-Sheet 1
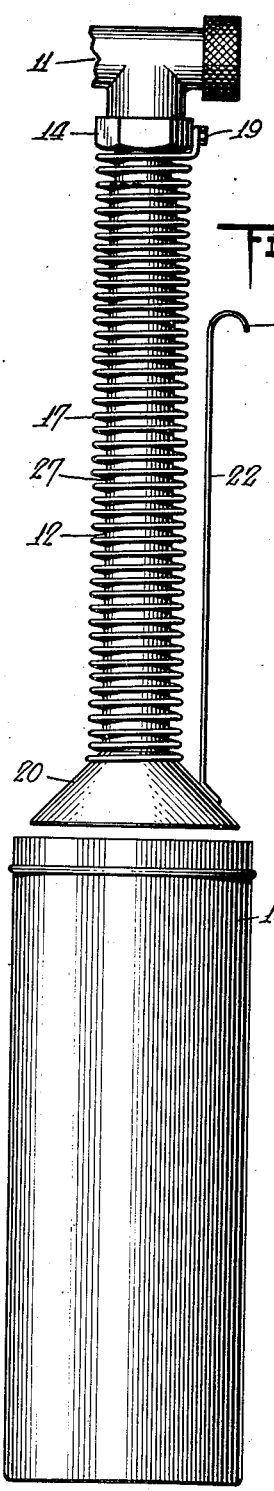
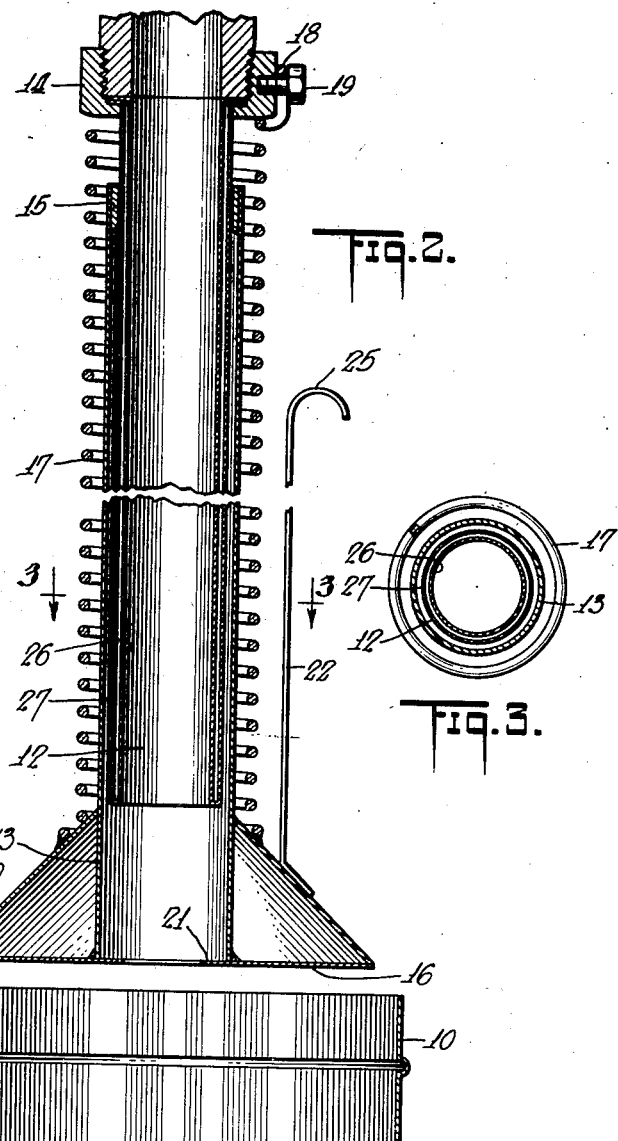
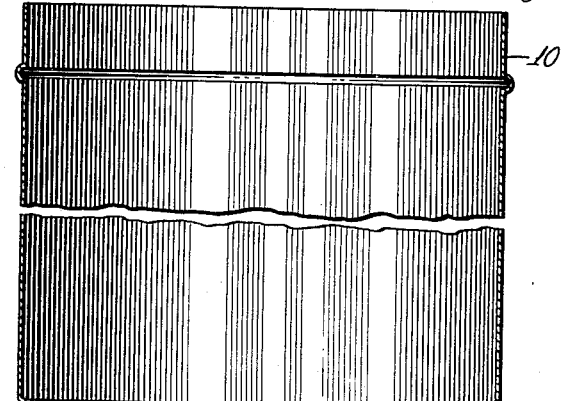
INVENTOR
*Clarence W. Vogt*
*Gilbert O. Wymond*
BY
ATTORNEYS

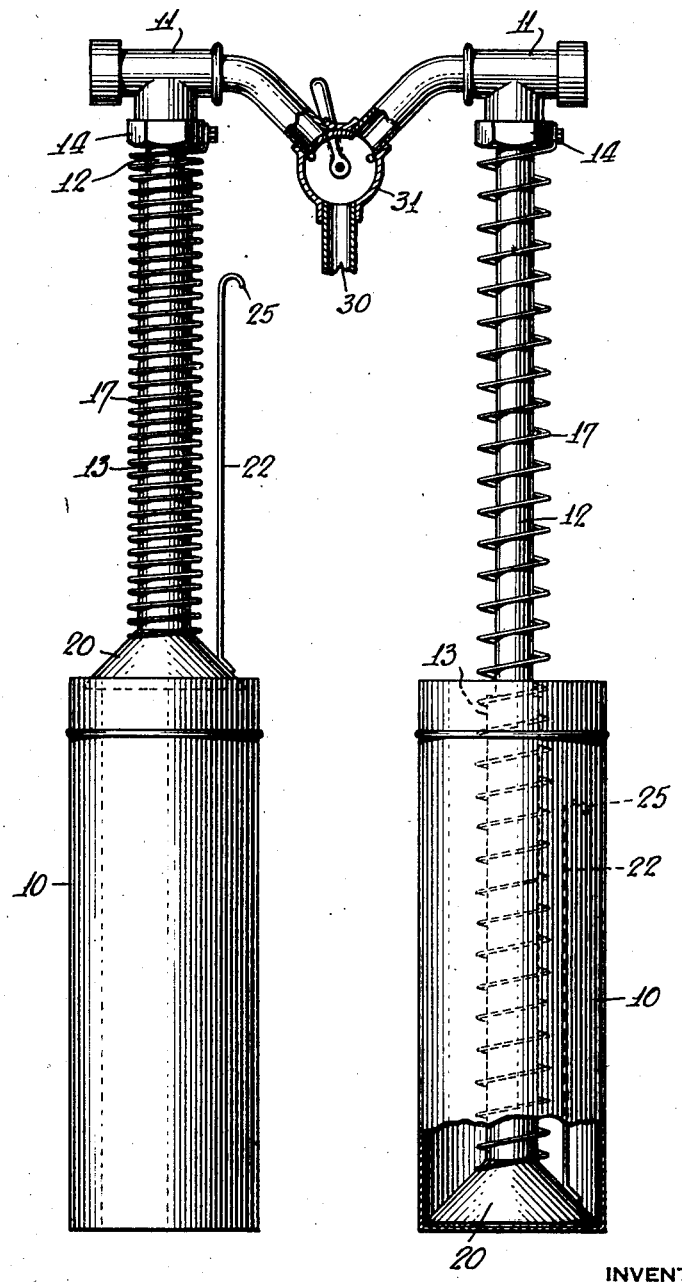

Patented Oct. 4, 1932

1,881,106

UNITED STATES PATENT OFFICE

CLARENCE W. VOGT AND GILBERT O. WYMOND, OF LOUISVILLE, KENTUCKY, ASSIGNORS TO VOGT INSTANT FREEZERS INCORPORATED, OF LOUISVILLE, KENTUCKY, A CORPORATION OF DELAWARE

CAN FILLER

Application filed October 25, 1929. Serial No. 402,362.

This invention relates to the filling of containers with plastic material or other material capable of being forced under some pressure through a conduit into a container and requiring the maintenance of some pressure on the material in the container during the filling of the latter to cause the material to conform to the space to be filled and to prevent undesirable voids or air pockets. Merely as an example of such material we will hereinafter refer only to ice cream which, after being frozen to plastic form, is delivered through a conduit to the receptacle for hardening, storage and shipment. The same apparatus might be employed for filling receptacles with leaf lard, hydrogenated oils, etc.

As one important feature of the invention there is provided a member for distributing the material transversely of the receptacle as it is delivered and in effect packing the material in the receptacle, said member being so mounted that it moves upwardly in the receptacle as the material accumulates therein.

As another important feature the drag or resistance to flow of the material through the conduit projecting into the receptacle is utilized for controlling the position of the member and the pressure which it exerts on the material.

As a further important feature the pressure exerted by the member is maintained substantially constant throughout its range of movement.

As a further feature this substantially constant pressure is secured by the counter action of a spring and the drag of the material. As the receptacle fills the supply conduit shortens and the downward pressure exerted by the dragging effect decreases, but the tension of a spring acting against gravity on the pressure applying member decreases. Thus the effective supporting action of the spring decreases with the decrease in the drag and the resultant pressure is maintained substantially uniform and constant.

If the apparatus is to be used with material below the freezing point of water, there is provided, as a further important feature of the invention, a construction of the supply conduit such that the formation on the conduit of frozen moisture from the atmosphere is prevented and the sections of the conduit may freely telescope.

As a further feature the conduit at its delivery end is so constructed that the material in the terminal portion is prevented from falling out to any objectionable extent during the removal of a filled receptacle and the substitution of a receptacle to be filled.

As a further feature the pressure applying means is so constructed that material cannot accumulate upon the upper surface thereof to modify the pressing action, or cause the said member to be buried in the accumulating material in the receptacle.

In the accompanying drawings there is illustrated only one embodiment of the invention, but it will be evident that various changes may be made in the details of construction and the arrangement of parts within the scope of the appended claims and without departing from the spirit of the invention.

In these drawings:

Fig. 1 is a side elevation of the apparatus with the filling tube in raised position.

Fig. 2 is a vertical longitudinal section, portions being broken away, and the parts being shown on a larger scale.

Fig. 3 is a transverse section on the line 3—3 of Fig. 2, and

Fig. 4 is a side elevation partly in section, showing a pair of filling tubes for alternate operation.

The type of apparatus illustrated is especially adapted for filling an ordinary ice cream can 10 such as is commonly used for the storage and hardening of ice cream. The filling apparatus is connected to any suitable source of supply such as a conduit 11 which may be directly connected to a continuous freezer or to a hopper or other vessel into which batches of ice cream are delivered from a batch freezer.

Certain types of continuous freezers in connection with which the present apparatus is particularly useful are shown in the Vogt Patents 1,783,864, 1,783,865, 1,783,866 and 1,783,867, issued Dec. 2, 1930.

Depending from the supply conduit 11 is a delivery conduit illustrated as comprising two telescoping sections 12 and 13. The upper section 12 is preferably detachably secured to the supply conduit, as for instance, by a collar 14, and is disposed above the top of the can. The sections are of such length that when said conduit is extended to its maximum length the terminal section 13 may project into the can to the desired depth, as for instance, into the lower portion thereof or near the bottom. The sections may telescope to such an extent that the lower end of the terminal section comes above the top of the can. Thus cans may be moved laterally into and out of position.

To permit free telescoping movement one of the sections, preferably the terminal movable section 13, is made slightly larger than the stationary section 12 and is spaced slightly therefrom by one or more guide surfaces, as for instance, a collar 15 at the upper end thereof.

As an important feature of the invention the movable conduit section 13 is provided with means for spreading out the material within the can, forcing upwardly the said section at a rate dependent upon the rate of accumulation of material in the can, and maintaining pressure on the material during the accumulation thereof.

In the form illustrated the section 13 is provided with a member 16 at the lower end thereof which is in the form of a transverse annular disk or plate with a central aperture registering with the conduit outlet, and adapted to rest on the material in the can. The disk corresponds in a general way to the cross-sectional area of the can, but is slightly smaller than the inside of the can so that it does not contact with the walls of the latter.

The two telescoping conduit sections are connected together by spring or resilient means which supports, in whole or in part, the weight of the movable conduit section and the member 16. The spring means may be in the form of a plurality of coil springs or of other suitable construction, but preferably includes a single coil or helical spring 17. This spring has its upper end supported, as for instance, by a terminal hook 18 engaging a pin or lug 19 on the collar 14 and has its lower end secured to the movable section 13. This connection of the spring to the lower conduit section and to the member 16 is shown as including a conical baffle wall 20 with its outer edge soldered, welded or beaded to the outer edge of the member 16 and its upper inner edge soldered or welded to the periphery of the conduit section. The lower end of the spring may be soldered or welded directly to the upper surface of this wall 20. The wall 20 performs an additional function as will be later pointed out.

The tension of the spring is such that when no material is being forced through the delivery conduit 12—13, the conduit section 13 will be supported in a position somewhat below that illustrated in the drawings. As the material is forced through the delivery conduit in contact with the exposed inner surface of the lower portion of the lower conduit section, considerable friction or drag will be exerted on this inner surface which will tend to carry the lower floating section and pressure maintaining member downwardly against the tension of the spring 17. The farther the conduit section 13 descends the greater will be the exposed inner surface and the greater will be the downward pull or drag on this conduit section. This will distend the spring and increase its tension. The downward movement will continue until the two forces counteract each other. The parts may be so designed that this balancing of forces will occur when the member 16 reaches a point near the bottom of the can.

As the material accumulates in the can beneath the member 16 it will be spread out and distributed by the member 16, but the drag of the material through the conduit section will hold the member 16 down upon the surface of the material with such pressure as is necessary to insure the even distribution and the avoiding of any air pockets or undesirable voids in the accumulated material. As the level of the material rises the member 16 is forced upwardly, and thus the tension on the spring will decrease, and the portion of the inner surface of the conduit section 13 which is exposed to frictional contact with and drag by the material will decrease. These forces counteract each other and the pressure on the material in the can will remain substantially constant during the upward movement of the conduit section 13 and the distributing member 16. When this member reaches the top of the can, the spring 17 will have very little tendency to further lift the member and the drag of the incoming material will be comparatively slight so that the main pressure exerted is that due to the action of the gravity on the conduit section 13 and the distributing member 16.

The pressure exerted may be kept greater than that which would be due to gravity alone by reducing the outlet section 13 and thereby increasing frictional resistance and drag. As shown the wall 16 is extended inwardly into the conduit 31 to a short distance to form a flange 21 which, if desired, may have its central opening even smaller than the inside diameter of the upper conduit section 12. This flange serves an additional function in that when the can has been filled to the desired level and the flow of material has been shut off, for instance, by a suitable regulating valve in the supply conduit 11, the member 16 may be lifted and held in raised position while a filled can is removed and an empty one substituted. During this interchange of cans the flange 21 will prevent any considerable portion of the material in the terminal portion of the delivery conduit section 13 from falling out.

For manually raising the member 16 and holding it in raised position any suitable form of handle or lifting means may be employed. As shown a metal bar or rod 22 is mounted outside of and substantially parallel to the spring 17 and has its lower end riveted or welded to the wall 20. The upper end of the rod may be provided with a suitable handle 25. The operator may press down on this handle during the filling of the can to increase the effective pressure of the member 16, if desired.

When using the apparatus with ice cream the latter in its partly frozen condition will be at a temperature considerably below that at which moisture will freeze out from the atmosphere. To prevent the warming up of the ice cream during its flow through the delivery conduit and at the same time to prevent frost from accumulating on the exterior due to freezing of moisture thereon from the atmosphere, one or both of the conduit sections 12 and 13 may be heat insulated. As illustrated the inner conduit section 12 is formed of two concentric tubes 26 and 27 connected together at their ends and spaced apart to a slight extent along their lengths to provide a dead-air chamber serving as a heat insulation. The outer conduit section 13 is not necessarily of this construction as it is spaced from the cold material not only by the inner conduit, but also by the air space below the guide collar 15.

As the pressure applying member 16 is of somewhat smaller diameter than the can, the material in the can may in some cases tend to crowd up past the member to the upper surface thereof. Furthermore, the pressure or plasticity or other condition may be such that the material may be forced up between two conduit sections 12 and 13 and overflow the upper end of the outer conduit section. The diagonal baffle wall 20 tends to prevent the accumulation of the material from either source upon the upper surface of the plate 16 and thus prevents this plate from being buried in the material accumulating in the can. Any material reaching the upper surface of this baffle will at once slide off. It will be obvious that the weight of the parts, the relative proportions thereof, the tension of the spring means and other details, may be varied in accordance with the proportions of the receptacle to be filled, the character of the material delivered, the pressure to be applied on the material and other such factors or conditions of use.

There is illustrated only a single unit in Figs. 1 and 2, but in practice, particularly where the material is continuously delivered from a freezer or other processing machine, preferably there will be provided a plurality of the units as shown in Fig. 4 connected to the same supply conduit 30 by suitable valve mechanism 31 whereby the flow to any unit may be shut off during interchange of receptacles. These two units operate alternately so that while one receptacle is being filled another may be removed and replaced by an empty one.

The term "receptacle" as used in the claims is intended to include not only a receptacle in which the material is to remain for some time, for instance, during shipment or storage, but also transfer receptacles from which the material may be intermittently or continuously withdrawn. Such a receptacle is embodied in the apparatus disclosed in the Vogt Patent No. 1,810,740, issued June 16, 1931.

Having thus described the invention, what we claim as new and desire to secure by Letters Patent is:

1. A filling device for receptacles, including a delivery conduit adapted to project into the open top of the receptacle, a pressure applying member at the lower end thereof, with its edges spaced from the walls of said receptacle to form an annular passage, and means for guiding material from the upper side of said member to said passage.

2. A filling device for receptacles, including a delivery conduit adapted to project into the open top of the receptacle, means at the delivery end for laterally distributing the material as it accumulates, and an inclined baffle wall for preventing the accumulation of the material upon the upper side of last mentioned means.

3. A receptacle filling device, having a delivery conduit adapted to project into the open top of the receptacle to be filled, including a pair of telescoping conduit sections, and an annular pressure applying member carried by the lower section at the lower end thereof and of slightly smaller diameter than said receptacle, said member having a passage therethrough registering with the outlet of the conduit section, but of smaller diameter than the inside diameter of either section.

4. A filling device, including a pair of telescoping conduit sections, the terminal section having a variable drag exerted thereon by the material passing therethrough and tending to force the last mentioned section downwardly, a pressure applying means at the lower end of said last mentioned section adapted to rest on the accumulated material in the receptacle and to telescope said sections and reduce said drag as the receptacle fills, and yielding means tending to lift said member and said conduit section to counteract the effect of said drag.

5. A filling device, including a pair of telescoping conduit sections, the terminal section having a variable drag exerted thereon by the material passing therethrough and tending to force the last mentioned section downwardly, a pressure applying member at the lower end of said last mentioned section adapted to rest on the accumulated material in the receptacle and to telescope said sections and reduce said drag as the receptacle fills, and yielding means acting to lift said member and said conduit section as the material accumulates to thereby maintain said member in contact with the upper surface of said material with a substantially constant pressure.

6. A receptacle filling device, including a pair of telescoping conduit sections, the terminal section having a variable drag exerted thereon by the material passing therethrough, tending to force said section downwardly, an annular laterally extending wall secured to the lower end of the lower section and adapted to apply pressure to the material as it accumulates therebeneath, and a conical wall extending downwardly and outwardly from the periphery of the lower conduit section to the periphery of said annular member.

7. A receptacle filling device, including a conduit adapted to project into the receptacle, an annular wall extending outwardly from the lower end thereof adapted to serve as a pressure applying and material distributing means, and an annular inclined wall extending downwardly and outwardly from the periphery of said conduit at a point above the lower end thereof to the periphery of said annular member.

8. A filling device, including a pair of telescoping conduit sections, the terminal section having a variable drag exerted thereon by the material passing therethrough and tending to force the last mentioned section downwardly, a pressure applying means at the lower end of said last mentioned section adapted to rest on the accumulated material in the receptacle and to telescope said sections and reduce said drag as the receptacle fills, and a coiled spring encircling said conduit and having its upper end secured to the upper conduit section and its lower end to said lower conduit section to support in part the weight of said lower section and said pressure applying means.

9. A receptacle filling device, including a pair of telescoping tube sections, means including a laterally extending wall at the lower end of the lower section for applying pressure to the accumulated material within the receptacle, and means at the delivery end of the lower section for resisting the free outflow of material therefrom.

10. A receptacle filling device, including a conduit adapted to extend into the receptacle to be filled and including a pair of conduit sections, the upper section being formed of a pair of concentric rigidly connected tubes with an intervening air space and the lower end section having a guiding slidable collar on the upper section, and having at the lower end an annular outwardly extending pressure applying and material distributing wall, an inwardly extending comparatively narrow annular projection, and a conical wall having its upper inner end connected to the periphery of the lower section and its lower outer end connected to the periphery of said first mentioned wall, and a helical spring having its upper end connected to the upper end of said upper conduit section and its lower end connected to said conical wall.

11. A receptacle filling device, including a plurality of delivery conduits each including a substantially stationary tube and a lower tube mounted to telescope thereon and adapted to project into the open top of a separate receptacle, means for raising the lower end of each of said lower tubes to automatically maintain it at the level of the material accumulating in said receptacle, and means for supplying material to said conduits alternately.

12. A filling device for receptacles, including a stationary supply conduit, a plurality of depending delivery conduits each adapted to project into the open top of a receptacle and each including telescopic sections, a laterally extending member at the lower end of the lower section adapted to laterally distribute the material as it accumulates beneath said member, and valve mechanism for connecting said delivery conduits alternately to said supply conduit.

13. A filling device for receptacles, including a supply conduit, a pair of delivery conduits each adapted to extend into the open top of a receptacle, valve mechanism for connecting said delivery conduits to said supply conduit alternately, and a spring connected to the lower portion of each of said delivery conduits for raising the lower end thereof in the receptacle as the material accumulates in the receptacle.

14. A device for filling a receptacle with a plastic or semi-liquid material, including a normally stationary upper tube, a lower tube of larger size and mounted to telescope thereon, the frictional engagement of the material delivered therethrough with the inner surface of the lower tube serving to exert a drag thereon tending to force said lower tube into the receptacle, means for maintaining the lower end of said lower tube adjacent to the level of the material in said receptacle, and a spring connected to said lower tube and tending to lift the latter, the lifting force of said spring decreasing as said tube rises and the exposed inner surface and the downward drag on said tube decreases.

15. A device for filling a receptacle with a plastic or semi-liquid material, including a normally stationary upper tube, a lower tube of larger size adapted to project into the receptacle, and mounted to telescope on said upper tube to vary the area of the inner surface of said lower tube exposed to contact with the material being delivered therethrough, a spring connected to the lower portion of the lower tube and tending to lift the latter and decrease the area of said exposed inner surface, and a manually operable lifting member also connected to the lower portion of said lower tube and extending upwardly therefrom.

16. A device for filling a receptacle with a plastic or semi-liquid material, including an upper normally stationary tube, a lower tube of large size spaced therefrom and mounted to telescope thereon, means at the upper end of the lower tube for guiding it on the upper tube, whereby the lower end of the lower tube may have limited lateral movement, means for maintaining the lower end of the lower tube substantially at the level of the material in the receptacle being filled, and a spring encircling both tubes and having one end connected to the lower portion of the lower tube and the other end connected to the upper tube at a point above the upper limiting position of the upper end of the lower tube.

17. A device for filling a receptacle with a plastic or semi-liquid material, including an upper normally stationary tube, a lower tube of large size, spaced therefrom and mounted to telescope thereon, means for maintaining the lower end of the lower tube substantialy at the level of the material in the receptacle being filed, and a spring encircling both tubes and having one end connected to the lower portion of the lower tube and the other end connected to the upper tube at a point above the upper limiting position of the upper end of the lower tube.

18. An apparatus for filling receptacles with a refrigerated plastic or semi-liquid material, including a conduit section having the wall thereof presenting a smooth exterior surface and constructed to retard the transmission of heat therethrough and the accumulation of frost on the said exterior surface thereof, a second conduit section adapted to extend into the receptacle and telescopically mounted to slide on said exterior frost-free surface, and means for raising said second conduit section in respect to the receptacle as the receptacle fills.

Signed at Louisville in the county of Jefferson and State of Kentucky this 10 day of October 1929.

CLARENCE W. VOGT.
GILBERT O. WYMOND.